United States Patent [19]

Strachan

[11] 4,190,629

[45] Feb. 26, 1980

[54] EMISSION CONTROL APPARATUS FOR DIESEL ENGINES

[75] Inventor: John B. Strachan, Wamberal, Australia

[73] Assignee: Domino Equipment Pty. Ltd., New South Wales, Australia

[21] Appl. No.: 855,433

[22] Filed: Nov. 28, 1977

[51] Int. Cl.² .................. F01N 3/02; F01N 3/08; F01N 3/15

[52] U.S. Cl. .................. 422/169; 55/256; 55/441; 60/297; 60/298; 422/173; 422/177; 261/123

[58] Field of Search ............. 23/288 F; 55/255, 256, 55/441, DIG. 30; 60/297, 298; 422/169, 173, 177, 180; 261/123, 124

[56] References Cited

U.S. PATENT DOCUMENTS

| | | | |
|---|---|---|---|
| 2,677,601 | 5/1954 | Ruth | 55/DIG. 30 |
| 2,785,962 | 3/1957 | Ruth | 23/288 F X |
| 2,790,506 | 4/1957 | Van Vactor | 23/288 F X |
| 2,870,862 | 1/1959 | Norment | 23/288 F X |
| 3,000,707 | 9/1961 | Barston | 60/297 X |
| 3,391,521 | 7/1968 | Pal | 60/297 X |
| 3,436,192 | 4/1969 | Karlsson | 23/288 F |
| 3,476,524 | 11/1969 | Burke | 23/288 F |
| 3,672,171 | 6/1972 | Eknayan | 60/297 X |
| 3,768,981 | 10/1973 | Alliger | 23/288 F |
| 4,091,616 | 5/1978 | Loweg | 60/298 X |

FOREIGN PATENT DOCUMENTS 624529 11/1961 Italy ........................................... 60/297

*Primary Examiner*—Joseph Scovronek
*Assistant Examiner*—Roger F. Phillips
*Attorney, Agent, or Firm*—Haseltine, Lake & Waters

[57] ABSTRACT

Apparatus for controlling the emission of exhaust gas from a diesel engine used in mining operations consists of a purifier chamber within a water jacketed adaptor and having an inlet for connection to the outlet from the exhaust manifold of the engine. The purifier chamber contains a catalytic purifier for the reduction of carbon monoxide passing from the inlet of the purifier chamber to its outlet, which is connected to a water scrubber for the reduction of the temperature of exhaust gases, the removal of some of the products of combustion, and for quenching exhaust flames.

3 Claims, 1 Drawing Figure

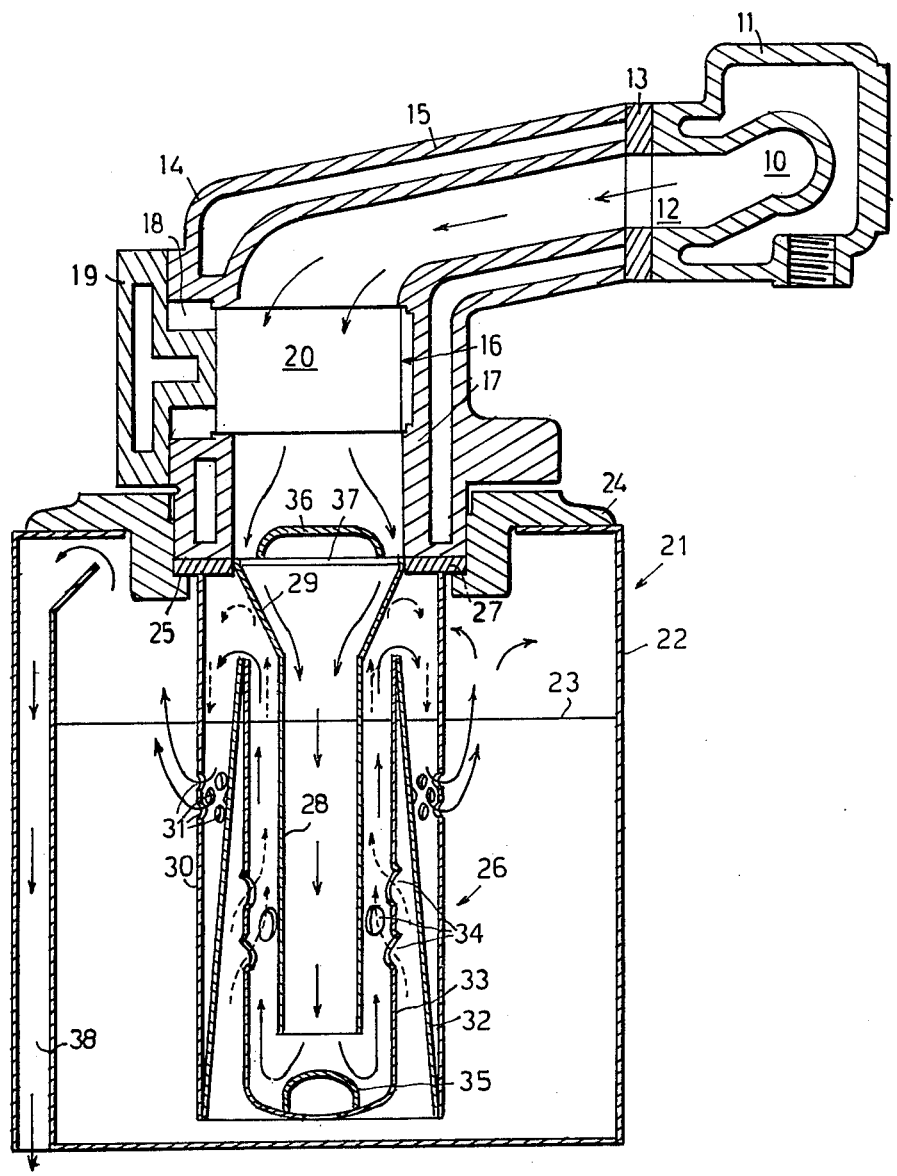

EMISSION CONTROL APPARATUS FOR DIESEL ENGINES

BACKGROUND OF THE INVENTION

This invention relates to emission control apparatus for diesel engines used in mining operations.

There is a widespread use of diesel engine powered plants in fiery gaseous mining application, and the manufacturers of such plants are required to comply with rigid regulations during the design, development and manufacturing stages of existing models and new projects. The plants are also subject to regular checks after being placed in service to ensure continual compliance with the regulations for their design and use.

The preparation of diesel engines for use in gaseous applications has reference to flame paths, skin temperature of engine and attachments, final exhaust gas temperatures, final exhaust gas emission analysis and automatic shut-down systems. Of these, the most troublesome area to manufacturers, users and inspectors has been the control of exhaust gas emissions. In tuning diesel engines to meet the requirements for emissions it is generally necessary to use a combination of injector pump deration and advance retardation of the injection point. This gives rise to problems of loss of latent engine power, costly trial and error tuning and maintenance and/or replacement of pumps with respect to correct deration and timing.

SUMMARY OF THE INVENTION

The present invention has been devised with the general object of greatly reducing the said present disadvantages by providing a simple and efficient emission control apparatus for diesel engines employed in fiery gaseous applications which simplifies regulation of emissions to comply with the stringent requirements in such applications without the use of the trial and error techniques hitherto employed, and without undue loss of latent engine power.

Accordingly, the invention resides broadly in an emission control apparatus for a diesel engine including an adaptor, jacketed for cooling by circulated water; a purifier chamber within the adaptor; an inlet to the said chamber for connection to a diesel engine exhaust manifold outlet; an outlet from the said chamber; a catalytic purifier within the said chamber for reduction of carbon monoxide of exhaust gases passing from the said inlet through the said chamber to the said outlet; and a water scrubber connected to the said outlet for reduction of temperature of exhaust gases, removal of certain products of combustion, and for quenching exhaust flame. Preferably the purifier is removable from the purifier chamber by way of an access opening normally closed by a door of water jacket type. Other features of the invention will become apparent from the following description.

BRIEF DESCRIPTION OF THE DRAWING

The accompanying drawing shows in cross-section an emission control apparatus for a diesel engine according to one exemplary embodiment of the invention.

DETAILED DESCRIPTION OF THE PREFERRED EMBODIMENT OF THE INVENTION

The apparatus illustrated in this drawing includes the exhaust manifold 10 of a diesel engine (not shown), the manifold being enclosed within a water jacket 11 and cooled by the circulation through this jacket of water the temperature of which is thermostatically controlled.

To the outlet 12 from the exhaust manifold there is bolted an attachment plate 13 at one end of an adaptor 14. The adaptor is more or less in the form of an elbow with one arm 15 leading obliquely from the exhaust manifold outlet, and then down to a purifier chamber 16, from which the other arm 17 of the adaptor leads downwardly.

Access may be had to the purifier chamber 16 by way of an access opening 18 in the adaptor, this opening normally being closed by a door 19 bolted to the adaptor.

The adaptor 14 is of water jacketed construction, and the door 19 is also of water jacket form, the adaptor and its door being cooled by the circulation therethrough of water the temperature of which is thermostatically controlled.

Within the purifier chamber 16 there is closely fitted a substantially cylindrical catalytic purifier 20, generally of well-known type, capable of substantially reducing the emission of carbon dioxide, this purifier being removably inserted through the access opening 18 and held firmly in place by the door 19.

The downwardly directed arm 17 of the adaptor leads into a water scrubber indicated generally at 21, and including a casing 22 part-filled with water, the level of which is indicated at 23, and is kept constant by a feed from a cistern (not shown) supplied by water through a float-controlled valve (not shown) of usual type. Exhaust gas from the exhaust manifold 10 passes through the water cooled adaptor 14 and into a tubular inlet 23 of the scrubber, being constrained by a series of tubular baffles 24 coaxial with the inlet 23 to make a number of passes through the water before escaping by way of a scrubber outlet 25.

Secured and sealed to the top of the casing 22 is a top casting 24 through which is a circular opening, the diameter of which is reduced at the bottom to form an annular seating at 25.

A scrubber unit, indicated generally at 26, has a top ring 27 which is supported on the seating 25 and is held in place by the lower end of the arm 17 of the adaptor 14. The scrubber unit includes a central tube 28 of which the upper part 29 is of funnelled or coned form, its upper periphery being secured within the top ring 27. Secured to and depending from the outer part of the top ring is an outer perforated tube 30 formed with a circumferential series of apertures 31 below the water level 23. Secured within the bottom end of this outer perforated tube is a round-section upwardly tapered baffle 32, and within the upper end of this baffle, above the water level 23, is secured the upper end of an inner perforated tube 33 formed with a circumferential arrangement of perforations 34, below the level of the apertures 31, the tube, above each perforation, being deformed outwardly, and below each perforation being deformed inwardly. The bottom of the inner perforated tube 33 is closed and a dome 35 is secured on this closed bottom.

A domed baffle 36 is supported on a pair of parallel bars 37 secured across the upper part of the opening through the top ring 27.

Exhaust gas from the exhaust manifold 10 passes through the water-cooled adaptor 14 and through the catalytic purifier 20. The purifier gives optimum results at a fairly high temperature, which is well above the acceptable skin temperature for a diesel engine in fiery gaseous mining applications; but the water jacketing of the adaptor within which the purifier is housed ensures that skin temperature is kept at a low level even though the purifier is heated for optimum performance.

From the purifier, the gas passes through the arm 17 of the adaptor, about the periphery of the domed baffle 36, and through the central tube 28 of the scrubber unit, the direction of gas flow being indicated in the drawing by arrows drawn in unbroken lines. From the bottom of the central tube 28, the gas is directed upwardly, by the closed and domed bottom of the inner perforated tube 33, to pass between the central tube 28 and the inner perforated tube 33. Water, the flow of which is indicated in the drawing by arrows shown in broken lines, is drawn in through the perforations 34. The gas then passes down between the tapered baffle 32 and the outer perforated tube 30, out through the apertures 31 and into the upper part of the casing, from which it escapes to atmosphere by way of an outlet 38.

As shown in the drawing the bottom of inner tube 33 has an opening through to the underside of dome 35 and this ensures elimination of "hot spots" to the casing.

The water scrubber reduces final exhaust gas temperature to an acceptable level, removes some products of combustion in the form of sludges, and provides an effective flame trap against propagation of any exhaust flame to the atmosphere.

Tests have shown that apparatus according to the invention very significantly reduces the carbon monoxide and hydrocarbon emission levels above engine idling speed and required no maintenance during the first hundred hours of operation. The engine having been stabilized at idling speed, a period of only thirty-five to forty seconds was required to bring the catalytic purifier to full efficiency when the engine was operated at full load condition.

The purifier effects little if any reduction in the emission of oxides of nitrogen. However, to reduce such emission to acceptable levels is a simple exercise in the adjustment of pump timing and may be done without deration of the engine, so that maximum usable horsepower of the engine is available.

We claim:

1. An emission control apparatus for a diesel engine for use in gaseous mining applications comprising an adaptor which is jacketed for cooling by circulated water; a purifier chamber within the adaptor; an inlet to the said chamber for connection to the outlet from the exhaust manifold of a diesel engine; an outlet from the said chamber; a catalytic purifier within the said chamber for reduction of carbon monoxide of exhaust gases passing from the said inlet through the said chamber to the said outlet; a water scrubber comprising a casing to contain a quantity of water; an inlet to the casing of the water scrubber connected to the outlet from the said purifier chamber; a domed baffle positioned between said outlet from said purifier chamber and the inlet to said water scrubber; a two-pass scrubber unit within the casing connected to the inlet to the casing and adapted to direct exhaust gases on a circuitous path through water in the casing, said scrubber unit including:
   a central tube extending downwardly from the top of the casing and surrounding the casing inlet to a position below the water level of the casing;
   (ii) an inner perforated tube disposed coaxially about the central tube with perforations below the water level, its upper end above the water level, its lower end closed and below the lower end of the central tube;
   (iii) a dome secured to the lower end of said inner perforated tube and adapted to direct gases exiting downwardly from said central tube in an upward direction through said inner perforated tube;
   (iv) an outer perforated tube secured to the top of the casing and surrounding the casing inlet and disposed coaxially about the inner perforated tube and with perforations below the water level, and
   (v) an upwardly tapered tubular baffle with its lower end secured and sealed to that of the outer perforated tube and its upper end secured and sealed to that of the inner perforated tube.

2. An emission control apparatus according to claim 1 wherein:
   the said purifier is removable from the purifier chamber by way of an access opening normally closed by a water-jacketed door.

3. An emission control apparatus as claimed in claim 1, wherein the lower end of tube (ii) is provided with an opening through to the underside of the dome (iii) which is located above the opening.